United States Patent
Pasqua et al.

(10) Patent No.: US 8,689,662 B2
(45) Date of Patent: Apr. 8, 2014

(54) BOTTOM BRACKET ASSEMBLY FOR A BICYCLE AND SHAFT FOR SUCH AN ASSEMBLY

(75) Inventors: Paolo Pasqua, Vicenza (IT); Vittorio Babini, Treviso (IT)

(73) Assignee: Campagnolo S.R.L., Vicenza (IT)

( * ) Notice: Subject to any disclaimer, the term of this patent is extended or adjusted under 35 U.S.C. 154(b) by 626 days.

(21) Appl. No.: 12/325,526

(22) Filed: Dec. 1, 2008

(65) Prior Publication Data

US 2009/0145262 A1   Jun. 11, 2009

(30) Foreign Application Priority Data

Dec. 5, 2007   (IT) ............................. MI20070406 U

(51) Int. Cl.
    *B62M 3/00* (2006.01)
(52) U.S. Cl.
    USPC ....................................................... 74/594.1
(58) Field of Classification Search
    USPC ........... 74/594.1, 594.2, 594.3; 354/458, 545; 384/458, 545
    See application file for complete search history.

(56) References Cited

U.S. PATENT DOCUMENTS

| | | | |
|---|---|---|---|
| 529,110 A | 11/1894 | Copeland | |
| 535,706 A | 3/1895 | Luther | |
| 590,695 A | 9/1897 | Alcorn | |
| 593,562 A | 11/1897 | Brennan | |
| 594,109 A | 11/1897 | Weed et al. | |
| 596,846 A | 1/1898 | Brown | |
| 602,049 A | 4/1898 | Beard | |
| 648,077 A | 4/1900 | Ludlow | |
| 658,624 A | 9/1900 | Egger | |
| 846,239 A | 3/1907 | Osborne | |
| 951,137 A | 3/1910 | Lowrance | |
| 1,235,530 A | 7/1917 | Jones | |
| 1,449,235 A | 3/1923 | Lewis | |
| 2,136,125 A | 11/1938 | Delaval-Crow | |
| 3,306,101 A | 2/1967 | Holderer | |
| 3,347,112 A | 10/1967 | Thun | |

(Continued)

FOREIGN PATENT DOCUMENTS

| | | |
|---|---|---|
| CN | 1522929 | 8/2004 |
| DE | 012 57 613 | 12/1967 |

(Continued)

OTHER PUBLICATIONS

"A Folding MWB Two-Wheeled Recumbent", Nick Abercrombie Andrews. Human Power, spring-summer 1994, 11(2), pp. 18-21.

(Continued)

*Primary Examiner* — Vicky Johnson
(74) *Attorney, Agent, or Firm* — Volpe and Koenig, P.C.

(57) ABSTRACT

A bottom bracket assembly (1) of a bicycle is disclosed. The bottom bracket assembly includes a shaft (2) extending along a predetermined longitudinal direction and a pair of bearings (31, 41) adapted to rotatably support the shaft (2) with respect to a housing box (10) provided in a bicycle frame, the bearings (31, 41) being mounted on the shaft (2) at opposite end portions (3, 4) of the shaft (2). The opposite end portions (3, 4) of the shaft (2) have an outer diameter (D2) between 28 mm and 37 mm, bounds being included, and the distance (D1) between the median planes (Y1, Y2) of the bearings (31, 41) along the longitudinal direction is between 80 mm and 100 mm, bounds being included.

20 Claims, 4 Drawing Sheets

(56) References Cited

U.S. PATENT DOCUMENTS

| | | | |
|---|---|---|---|
| 3,578,829 A | 5/1971 | Hata et al. | |
| 3,888,136 A | 6/1975 | Lapeyre | |
| 3,906,811 A | 9/1975 | Thun | |
| 4,093,325 A | 6/1978 | Troccaz | |
| 4,208,763 A | 6/1980 | Schroder | |
| 4,300,411 A | 11/1981 | Segawa | |
| 4,331,043 A | 5/1982 | Shimano | |
| 4,406,504 A | 9/1983 | Coenen et al. | |
| 4,704,919 A | 11/1987 | Durham | |
| 4,810,040 A * | 3/1989 | Chi | 301/110.5 |
| 5,067,370 A | 11/1991 | Lemmens | |
| 5,243,879 A | 9/1993 | Nagano | |
| 5,437,510 A * | 8/1995 | Jeng | 384/538 |
| 5,493,937 A | 2/1996 | Edwards | |
| 5,624,519 A * | 4/1997 | Nelson et al. | 156/245 |
| 5,819,600 A | 10/1998 | Yamanaka | |
| 5,907,980 A | 6/1999 | Yamanaka | |
| 5,984,528 A | 11/1999 | Ohtsu | |
| 6,014,913 A | 1/2000 | Masahiro | |
| 6,116,114 A | 9/2000 | Edwards | |
| 6,192,300 B1 | 2/2001 | Watarai et al. | |
| 6,443,033 B1 | 9/2002 | Brummer et al. | |
| 6,564,675 B1 | 5/2003 | Jiang | |
| 6,581,494 B2 * | 6/2003 | Sechler | 74/594.1 |
| 6,790,535 B2 | 9/2004 | Nishimura et al. | |
| 6,829,965 B1 | 12/2004 | Mombrinie | |
| 6,886,676 B2 | 5/2005 | Von Levern et al. | |
| 6,938,516 B2 | 9/2005 | Yamanaka | |
| 6,983,672 B2 * | 1/2006 | Smith | 74/594.1 |
| 7,258,041 B2 | 8/2007 | Yamanaka et al. | |
| 7,267,030 B2 | 9/2007 | French | |
| 7,503,239 B2 | 3/2009 | Yamanaka | |
| 7,798,724 B2 | 9/2010 | Van De Sanden et al. | |
| 2001/0015390 A1 | 8/2001 | Hitomi et al. | |
| 2002/0081052 A1 | 6/2002 | Chi | |
| 2002/0096015 A1 | 7/2002 | Smith | |
| 2003/0006113 A1 | 1/2003 | Terada et al. | |
| 2003/0097901 A1 | 5/2003 | Yamanaka | |
| 2004/0162172 A1 | 8/2004 | Yamanaka et al. | |
| 2005/0011304 A1 | 1/2005 | Chiang | |
| 2005/0016323 A1 | 1/2005 | Dal Pra' | |
| 2005/0040699 A1 | 2/2005 | Chiang et al. | |
| 2005/0081678 A1 | 4/2005 | Smith et al. | |
| 2005/0217417 A1 | 10/2005 | Uchida et al. | |
| 2006/0103106 A1 | 5/2006 | Schlanger | |
| 2006/0112780 A1 | 6/2006 | Shiraishi et al. | |
| 2006/0288819 A1 | 12/2006 | Dal Pra' et al. | |
| 2007/0137426 A1 | 6/2007 | Meggiolan et al. | |
| 2007/0151410 A1 | 7/2007 | Meggiolan | |
| 2007/0204722 A1 | 9/2007 | Dal Pra' | |
| 2007/0207631 A1 | 9/2007 | Meggiolan et al. | |
| 2007/0283781 A1 | 12/2007 | Meggiolan | |
| 2008/0124018 A1 * | 5/2008 | Tanke et al. | 384/545 |
| 2009/0145262 A1 | 6/2009 | Pasqua et al. | |
| 2009/0261553 A1 | 10/2009 | Meggiolan | |
| 2011/0049834 A1 | 3/2011 | Natu | |

FOREIGN PATENT DOCUMENTS

| | | |
|---|---|---|
| DE | 023 59 437 | 6/1975 |
| DE | 297 15 373 U 1 | 8/1998 |
| DE | 200 03 398 | 5/2000 |
| EP | 0 756 991 A2 | 8/1996 |
| EP | 0 924 318 | 6/1999 |
| EP | 1 120 336 | 8/2001 |
| EP | 1120336 | 8/2001 |
| EP | 1 314 902 A1 | 5/2003 |
| EP | 1 342 656 A2 | 9/2003 |
| EP | 1 342 656 A3 | 9/2003 |
| EP | 1 449 760 A2 | 8/2004 |
| EP | 1 659 057 | 5/2006 |
| EP | 1 661 803 | 5/2006 |
| EP | 1659057 A2 | 5/2006 |
| EP | 1661803 A2 | 5/2006 |
| EP | 1 726 517 | 11/2006 |
| EP | 1 726 518 | 11/2006 |
| EP | 1 759 981 A2 | 3/2007 |
| EP | 1 759 981 A3 | 3/2007 |
| EP | 1759981 | 3/2007 |
| EP | 1 792 818 | 6/2007 |
| EP | 1 792 821 | 6/2007 |
| EP | 1792818 | 6/2007 |
| EP | 1792821 A1 | 6/2007 |
| EP | 1 820 726 | 8/2007 |
| EP | 1820726 | 8/2007 |
| FR | 0 623 094 | 6/1927 |
| FR | 0 863 610 | 4/1941 |
| FR | 0 934 104 | 5/1948 |
| FR | 2 801 863 | 6/2001 |
| FR | 2 870 508 | 11/2005 |
| GB | 2315776 | 2/1998 |
| JP | 57-128585 | 8/1982 |
| JP | 05319349 | 12/1993 |
| JP | 09104383 | 4/1997 |
| JP | 11225633 | 8/1999 |
| JP | 2000-289677 | 10/2000 |
| JP | 2003-261087 | 9/2003 |
| JP | 2004-106838 | 4/2004 |
| JP | 2004-249770 | 9/2004 |
| JP | 2004-275193 | 10/2004 |
| JP | 2005-001663 | 1/2005 |
| JP | 2005-053410 | 3/2005 |
| WO | 01/63134 | 8/2001 |
| WO | 02/32751 A2 | 4/2002 |
| WO | 2005-009832 | 2/2005 |
| WO | 2005/058682 | 6/2005 |

OTHER PUBLICATIONS http://web.archive.org/web/20050210021901/http://pardo.net/bike/pic/fail-005/000.html.
English translation of Oct. 27, 2010 Office Action issued in corresponding Chinese Appln. No. 20070085427.6.
European Search Report (EP08425259), Oct. 21, 2008.
Isis Drive Standard Committee, (Copyright 2001), *The International Spline Interface Standard*, (18 pgs.).
Isis Drive Standard Committee, (Copyright 2001), *The International Spline Interface Standard*, (18 pgs.)
Japanese Office Action and English translation for Application No. 2007-037411—Issued on Feb. 28, 2012.
Japanese Office Action and English translation for Application No. 2007-118028—Issued on Feb. 28, 2012.
Oct. 25, 2011 Office Action issued in Japanese Appln. No. 2006-326959.
English translation of Oct. 25, 2011 Office Action issued in Japanese Appln. No. 2006-326959.

\* cited by examiner

BOTTOM BRACKET ASSEMBLY FOR A BICYCLE AND SHAFT FOR SUCH AN ASSEMBLY

FIELD OF INVENTION

The following description concerns a bottom bracket assembly of a bicycle.

The description also concerns a shaft for such an assembly and a crank arm assembly comprising the aforementioned bottom bracket assembly of a bicycle.

The description also concerns a bicycle comprising the aforementioned bottom bracket assembly of a bicycle. Preferably, the aforementioned bicycle is a racing bicycle.

BACKGROUND

A bottom bracket assembly of a bicycle includes a shaft rotatably supported in a housing box suitably provided in the bicycle frame, and two crank arms associated with the opposite ends of the shaft. The shaft can be formed as a distinct piece from the crank arms, or it can be formed as a single piece with one of the two crank arms. Alternatively, the shaft can be formed as two or more pieces connected together through suitable connection means, each piece being formed integral with or distinct from a respective crank arm.

For the sake of simplicity of explanation, throughout the present description and subsequent claims, the embodiment in which the shaft is formed as a single piece will typically be described, except when expressly indicated the contrary. It should in any case be understood that what has been described is also applicable to a shaft which is formed as a plurality of pieces.

Moreover, throughout the present description, the component of the bottom bracket assembly of a bicycle consisting of the shaft (or of a shaft element), and of a crank arm, mutually coupled or formed as a single piece, will be identified as the "crank arm assembly."

The rotation of the shaft of the bottom bracket assembly with respect to the housing box is achieved through the use of a pair of rolling bearings mounted on the shaft. In particular, each bearing is typically mounted on the shaft at a respective end portion of the shaft body, in a position adjacent to the crank arm. When the bottom bracket assembly is mounted on the bicycle frame, each bearing is thus operatively interposed between the shaft and the respective housing box provided in the bicycle frame.

The bearings are typically supported outside of the aforementioned box through suitable adaptation elements which are mounted at the opposite free ends of the shaft-housing box.

Typically, the dimensions of the housing box of the shaft of the bottom bracket assembly and the dimensions of the individual components of the bottom bracket assembly, i.e. of the bearings, of the possible adaptation elements and of the shaft, are selected so as to ensure a desired rigidity in terms, for example, of resistance to the bending moment and torsional moment acting upon the shaft of the bottom bracket assembly due to the action imparted by the cyclist during pedaling.

For this purpose, the housing box of the shaft of the bottom bracket assembly typically consists of a hollow cylinder of standard length equal to 68 mm. Such a cylinder is internally threaded at its opposite free ends to receive, by screwing, a corresponding threaded portion of the respective adaptation element. Standardized threading M36×24 tpi (teeth per inch) or BC-1.37"×24 tpi is typically used, made on a diameter of the cylinder of about 34 mm. The shaft used is typically made from steel and has an outer diameter of 25 mm. Each bearing has an inner diameter of 25 mm and an outer diameter of 37 mm, whereas the distance between the median planes of the two bearings, along the longitudinal direction of the shaft, is equal to about 85 mm.

SUMMARY

The present disclosure is directed to a bottom bracket assembly of a bicycle that includes a shaft extending along a predetermined longitudinal direction, and a pair of bearings adapted to rotatably support the shaft with respect to a housing box provided in a bicycle frame. The bearings are mounted on the shaft at opposite end portions of the shaft. The opposite end portions of the shaft have an outer diameter comprised in the range between 28 mm and 37 mm, bounds being included. The distance between the median planes of the bearings along the longitudinal direction is comprised in the range between 80 mm and 100 mm, bounds being included.

The present disclosure is also directed to a shaft for a bottom bracket assembly of bicycle, including a body extending along a predetermined longitudinal direction and provided, at opposite end portions thereof, with respective seats for the coupling with respective bearings. The end portions each have an outer diameter comprised in the range between 28 mm and 37 mm, bounds being included. The distance between the median planes of the seats along the longitudinal direction is comprised in the range between 80 mm and 100 mm, bounds being included.

The present disclosure is also directed to a crank arm assembly of a bicycle including a crank arm and a bottom bracket assembly. The bottom bracket assembly includes a shaft extending along a predetermined longitudinal direction, and a pair of bearings adapted to rotatably support the shaft with respect to a housing box provided in a bicycle frame. The bearings are mounted on the shaft at opposite end portions of the shaft. The opposite end portions of the shaft have an outer diameter comprised in the range between 28 mm and 37 mm, bounds being included. The distance between the median planes of the bearings along the longitudinal direction is comprised in the range between 80 mm and 100 mm, bounds being included.

DETAILED DESCRIPTION OF THE PREFERRED EMBODIMENTS

Introduction to the Embodiments

Figure 1:
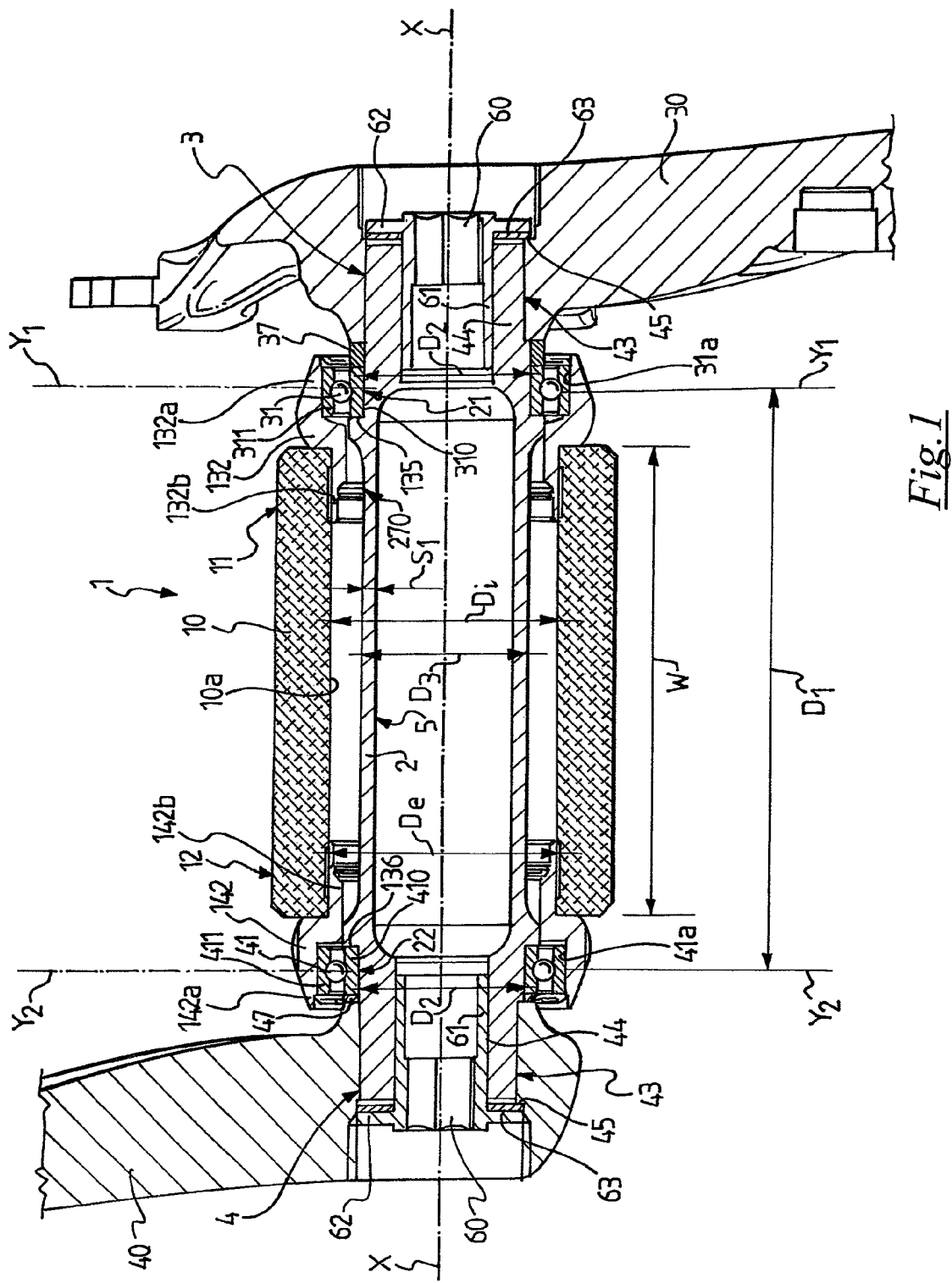
FIG. 1 schematically represents a longitudinal sectional view of a first embodiment of the disclosed bottom bracket assembly coupled with a pair of crank arms.

The present disclosure concerns, in a first aspect thereof, a bottom bracket assembly of a bicycle, comprising:

a shaft extending along a predetermined longitudinal direction;

a pair of bearings adapted to rotatably support the shaft with respect to a housing box provided in a bicycle frame, the bearings being mounted on the shaft at opposite end portions of the shaft;

wherein the opposite end portions of the shaft have an outer diameter between 28 mm and 37 mm, bounds being included, and the distance between the median planes of the bearings along the longitudinal direction is between 80 mm and 100 mm, bounds being included.

The increased dimension of the outer diameter of the shaft with respect to the shafts of the bottom bracket assemblies of the prior art makes it possible to use shafts made from lighter materials, such as aluminum or carbon fiber, while obtaining the same level of rigidity as with heavier materials, or it makes possible to further reduce the thickness of the shaft, if made from steel. In any case, a reduction in weight of the shaft, and therefore of the bottom bracket assembly comprising such a shaft can be obtained.

Moreover, the considerable distance between the median planes of the bearings has the effect of keeping down the bending moment generated at the end portions of the shaft.

In a first preferred embodiment of the bottom bracket assembly, a central portion of the shaft, defined between the opposite end portions, has an outer diameter equal to that of the opposite end portions.

In a further preferred embodiment of the bottom bracket assembly, a central portion of the shaft, defined between the opposite end portions, has a different outer diameter from that of the opposite end portions. For example, in order to make the shaft even lighter, the central portion, which undergoes less stress than the end portions, can have a smaller outer diameter than that of the end portions.

Preferably, the bearings have an outer diameter between 40 mm and 47 mm, bounds being included. In this way, bearings can be used having an inner diameter corresponding to the outer diameter of the end portions of the shaft, i.e. between 28 mm and 37 mm, which sizes can easily be found on the market.

The shaft can be made from metallic material, preferably aluminum or steel.

In this case, the shaft is hollow and preferably, in a central portion thereof, has a thickness less than or equal to 2 mm if made from aluminum, or a thickness less than or equal to 0.65 mm if made from steel. In this way, the shaft has a lower weight than those made from aluminum or steel of the prior art.

Alternatively, the shaft can be made from composite material. Preferably, the composite material includes structural fibers, such as carbon fibers, incorporated in a matrix of polymeric material.

In a preferred embodiment of the bottom bracket assembly, the composite material includes layers of fabric of structural fibers incorporated in a matrix of polymeric material. Preferably, the fibers of the fabric are orientated according to two substantially perpendicular directions, each inclined by about 45° with respect to the longitudinal direction.

In the case in which the shaft is made from composite material, the shaft is hollow and preferably, at a central portion thereof, has a thickness less than or equal to 3.5 mm. In this way, the shaft has a lower weight than those made from composite material of the prior art.

In a preferred embodiment of the assembly, at least one bearing of the pair of bearings is coupled with a respective adaptation element intended to be associated with a free end portion of the housing box. In this way, the length of the housing box, measured along the predetermined longitudinal direction, can be less than the distance between the median planes of the bearings.

Preferably, the adaptation element includes a substantially cylindrical portion of coupling with the housing box, the cylindrical portion having an outer diameter between 40 mm and 48 mm, bounds being included.

In another preferred embodiment of the assembly, the bearings are intended to be directly coupled with respective free end portions of the housing box.

In any case, the shaft can be formed as a single piece or can comprise at least two distinct shaft elements, connected together through mutual coupling means.

Preferably, the two shaft elements are mutually connected at respective free coupling ends provided with respective conjugate front toothings, preferably of the Hirth type. Such front toothings allow a precise centering between the shaft elements.

In a second aspect thereof, the present disclosure concerns a shaft for a bottom bracket assembly of a bicycle, comprising a body extending along a predetermined longitudinal direction and provided, at opposite end portions thereof, with respective seats for the coupling with respective bearings, in which the end portions each have an outer diameter between 28 mm and 37 mm, bounds being included, and the distance between the median planes of the seats along the longitudinal direction is between 80 mm and 100 mm, bounds being included.

Preferably, such a shaft individually, or in combination, has all of the structural and functional characteristics discussed above with reference to the shaft of the bottom bracket assembly of a bicycle.

In particular, in a preferred embodiment thereof, a central portion of the shaft body, defined between the opposite end portions, has an outer diameter equal to that of the opposite end portions.

Alternatively, a central portion of the shaft body, defined between the opposite end portions, has an outer diameter different from that of the opposite end portions.

The shaft can be made from metallic material, preferably aluminum or steel.

In this case, the aforementioned shaft is hollow and preferably, in at least one central portion thereof, has a thickness less than or equal to 2 mm, if made from aluminum, or a thickness less than or equal to 0.65 mm, if made from steel.

Alternatively, the shaft can be made from composite material. Preferably, the composite material includes structural fibers, such as carbon fibers, incorporated in a matrix of polymeric material.

In a preferred embodiment of the shaft, the composite material includes layers of fabric of structural fibers incorporated in a matrix of polymeric material. Preferably, the fibers of the fabric are orientated according to two substantially perpendicular directions, each inclined by about 45° with respect to the longitudinal direction.

In the case in which the shaft is made from composite material, the shaft is hollow and preferably, in at least one central portion thereof, has a thickness less than or equal to 3.5 mm.

In any case, the shaft can be formed as a single piece or can comprise at least two distinct shaft elements, connected together through mutual coupling means.

Preferably, the two shaft elements are mutually connected at respective free coupling ends provided with respective conjugate front toothings, preferably of the Hirth type.

In a third aspect thereof, the present disclosure concerns a crank arm assembly comprising a bottom bracket assembly of the type described above.

Preferably, such a crank arm assembly individually or in combination has all of the structural and functional characteristics discussed above with reference to the bottom bracket assembly.

DETAILED DESCRIPTION

With reference to FIG. 1, a bottom bracket assembly of a bicycle in accordance with a first embodiment is indicated with 1.

The assembly 1 comprises a shaft (also known as a spindle or axle) 2 having a longitudinal axis X-X extending along a predetermined longitudinal direction x. The shaft 2 comprises opposite end portions 3 and 4, right and left respectively, with which a right crank arm 30 and a left crank arm 40 are respectively associated.

The shaft 2 is rotatably supported in a housing box 10 appropriately provided in the bicycle frame through the interposition of a right radial bearing 31 and of a left radial bearing 41, mounted on the shaft 2 at the end portions 3 and 4.

Regarding this, the shaft 2, at the end portions 3 and 4, has a pair of shoulders 135 and 136 formed as a single piece with the body of the shaft 2, and defining two seats for coupling with the two bearings 31 and 41. In the assembled configuration of the bottom bracket assembly of FIG. 1, the bearings 31 and 41 are thus mounted on the end portions 3 and 4 of the shaft 2 in position adjacent to the crank arms 30 and 40.

The box 10 is defined by a substantially cylindrical hollow body 10a with axial length W and inner diameter Di. The body 10a extends along a longitudinal axis intended to coincide with the axis X-X of the shaft 2 when such a shaft is housed in the cavity of the box 10.

Between the bearings 31 and 41 and the box 10, a right adaptation element 132 and a left adaptation element 142 are respectively prearranged, both substantially annular shaped.

In particular, the bearings 31 and 41 are respectively inserted into a seat 31a of the right adaptation element 132 and into a seat 41a of the left adaptation element 142. Such seats 31a and 41a are made at axially outer end portions 132a and 142a, respectively, of the adaptation elements 132 and 142.

The opposite axially inner end portions 132b and 142b, respectively of the adaptation elements 132 and 142, are substantially cylindrical shaped with outer diameter De and are externally threaded to screw into conjugate internally threaded end portions 11 and 12 of the body 10a of the box 10. The body 10a of the box 10 thus has an inner diameter Di, apart from at the aforementioned internally threaded end portions 11 and 12, where the body 10a of the box 10 has a maximum inner diameter (at the bottom of the threading), greater than Di.

The median planes Y1 and Y2 of each bearing 31 and 41, i.e. the planes perpendicular to the axis X-X and passing halfway through each bearing 31 and 41, are spaced apart by a distance-between-centers D1.

In its assembled configuration, the bearing 31 has an inner ring 310 coupled with a portion 21 of the shaft 2, of diameter D2, and an outer ring 311 coupled with the seat 31a of the right adaptation element 132. Similarly, the bearing 41 has an inner ring 410 coupled with a portion 22 of the shaft 2, of diameter D2, and an outer ring 411 coupled with the seat 41a of the left adaptation element 142.

Figure 3:
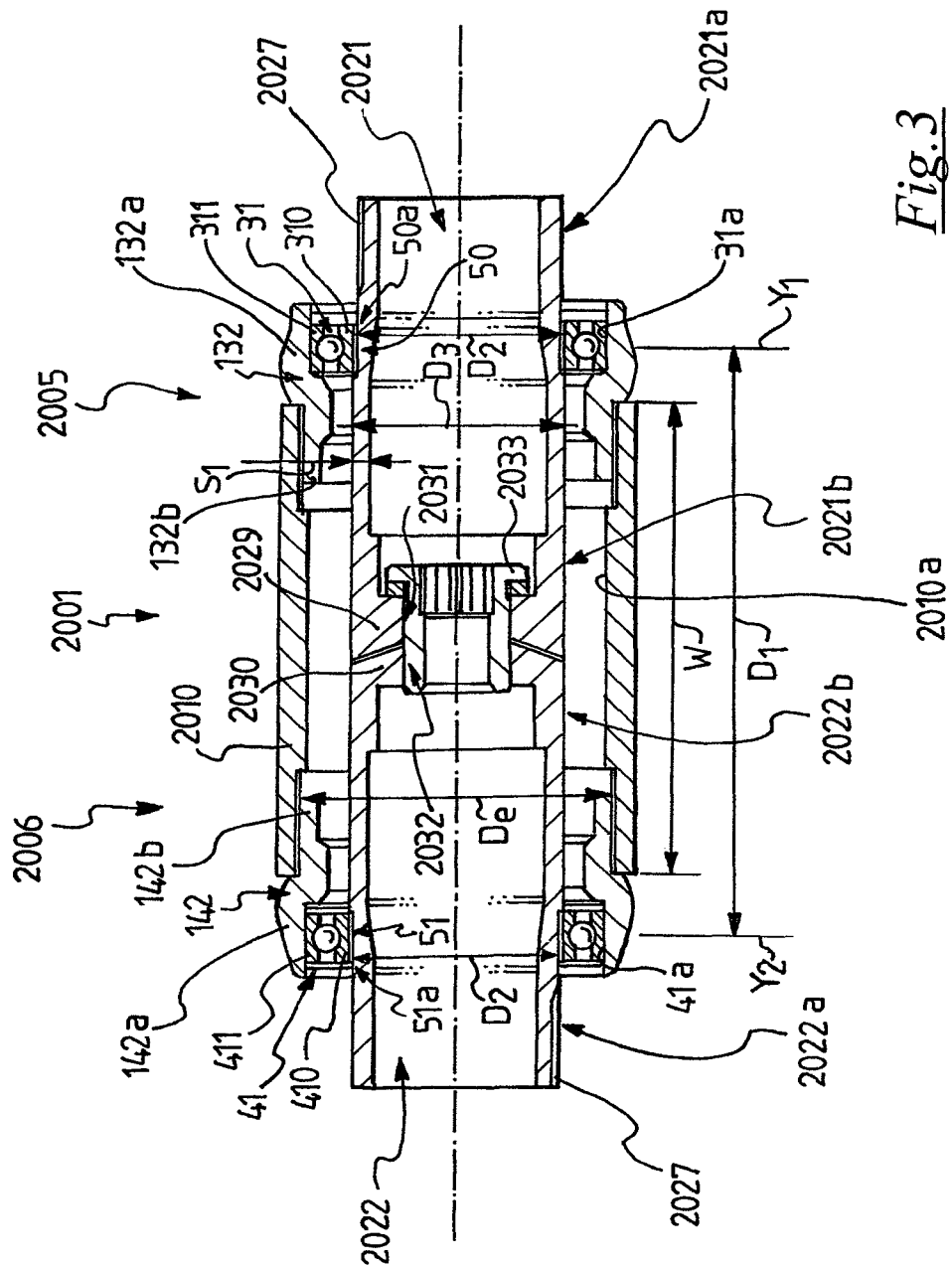
FIG. 3 schematically represents a longitudinal sectional view of a third embodiment of the disclosed bottom bracket assembly.

The right and left crank arms 30, 40 are coupled with the right and left ends 3 and 4 of the shaft 2 through a shape coupling (defined for example by ridges and grooves) that allows a displacement of the crank arms 30, 40 with respect to the shaft 2 parallel to the axis X-X of the shaft 2 (as described in EP 1 820 726 with reference to FIG. 3).

The locking of the right crank arm 30 (or the left one 40, respectively) on the right end portion 3 (or the left end portion 4, respectively) of the shaft 2 in a desired axial position is achieved through a screw 60 screwed into a threaded hole 61 made in the right end portion 3 (or the left end portion 4, respectively) of the shaft 2.

The screw 60 is inserted into the hole 43 of the right crank arm 30 (or the left one 40, respectively) and has a head 62 intended to abut the shoulder 45 formed in the hole 43 of the right crank arm 30 (or the left one 40, respectively). Between the shoulder 45 and the head 62 of the screw 60, a washer 63 is interposed to improve the distribution of the tensions between screw 60 and the respective abutment face defined in the right end portion 3 (or the left end portion 4, respectively) of the shaft 2.

The shaft 2 comprises, between the right end portion 3 and the left end portion 4, a central portion 5 of constant outer diameter D3. In the non-limiting example of FIG. 1, D3 is substantially equal to D2. Examples of materials the shaft 2 can be made from include aluminum, steel and composite materials comprising structural fibers incorporated in a matrix of polymeric material, or layers of fabric of structural fibers incorporated in a matrix of polymeric material. Preferably, the structural fibers of the shaft 2 are carbon fibers. Moreover, preferably the fibers of the fabric are orientated according to two substantially perpendicular directions, each inclined by about 45° with respect to the longitudinal direction x.

The shaft 2 is defined by a substantially cylindrical hollow body having, in its central portion 5, thickness S1.

Between the right crank arm 30 and the inner ring 310 of the right bearing 31, a right spacer 37 is interposed. Alternatively, the spacer 37 can be omitted in the case in which the body of the right crank arm 30 is shaped, at the hole 43 and on the side directed towards the adaptation element 132, so as to directly abut the inner ring 310 of the right bearing 31.

Each bearing 31, 41 is inserted onto the shaft 2 from a respective end thereof and is pushed against the respective shoulder 135, 136 by the respective crank arm 30, 40, when it is mounted on the respective end portion 3, 4 by screwing the respective screw 60.

The bottom bracket assembly 1 preferably has a distance-between-centers D1 between 80 and 100 mm, a diameter D2 between 28 and 37 mm, an inner diameter of the bearings 31 and 41 between 28 and 37 mm, an outer diameter of the bearings 31 and 41 between 40 and 47 mm and a diameter De between 40 and 48 mm.

The Applicant has identified as being particularly advantageous, a bottom bracket assembly 1 having a distance-between-centers D1 equal to about 85 mm, a diameter D2 equal to about 30 mm or 35 mm, an inner diameter of the bearings 31 and 41 equal to about 30 mm, an outer diameter of the bearings 31 and 41 equal to about 42 mm, and a diameter De equal to about 42 mm.

In the case in which the shaft 2 is made from aluminum, the thickness S1 is preferably less than or equal to 2 mm if the diameter D2 is equal to about 30 mm, whereas it is preferably less than or equal to 1.2 mm if the diameter D2 is equal to about 35 mm. More preferably, the thickness S1 is equal to about 1.8 mm if the diameter D2 is equal to about 30 mm, whereas it is equal to about 1 mm if the diameter D2 is equal to about 35 mm.

In the case of a shaft made from composite material with structural fibers incorporated in a matrix of polymeric material, the thickness S1 is preferably less than or equal to 3.5 mm if the diameter D2 is equal to about 30 mm, whereas it is preferably less than or equal to 2 mm if the diameter D2 is equal to about 35 mm. More preferably, the thickness S1 is equal to about 2.5 mm if the diameter D2 is equal to about 30 mm, whereas it is equal to about 1.2 mm if the diameter D2 is equal to about 35 mm.

In the case of a shaft made from steel, the thickness S1 is preferably less than or equal to 0.65 mm if the diameter D2 is equal to about 30 mm, whereas it is preferably less than or equal to 0.5 mm if the diameter D2 is equal to about 35 mm. More preferably, the thickness S1 is equal to about 0.55 mm if the diameter D2 is equal to about 30 mm, whereas it is equal to about 0.3 mm if the diameter D2 is equal to about 35 mm.

In the non-limiting example of FIG. 1, the diameter D3 of the shaft 2 is equal to the diameter D2. In alternative embodiments, however, the diameter D3 can be different to the diameter D2 (either greater or smaller, possibly providing suitable shapings), just as the thickness S1 of the shaft 2 can vary along the axis X-X.

Figure 2:
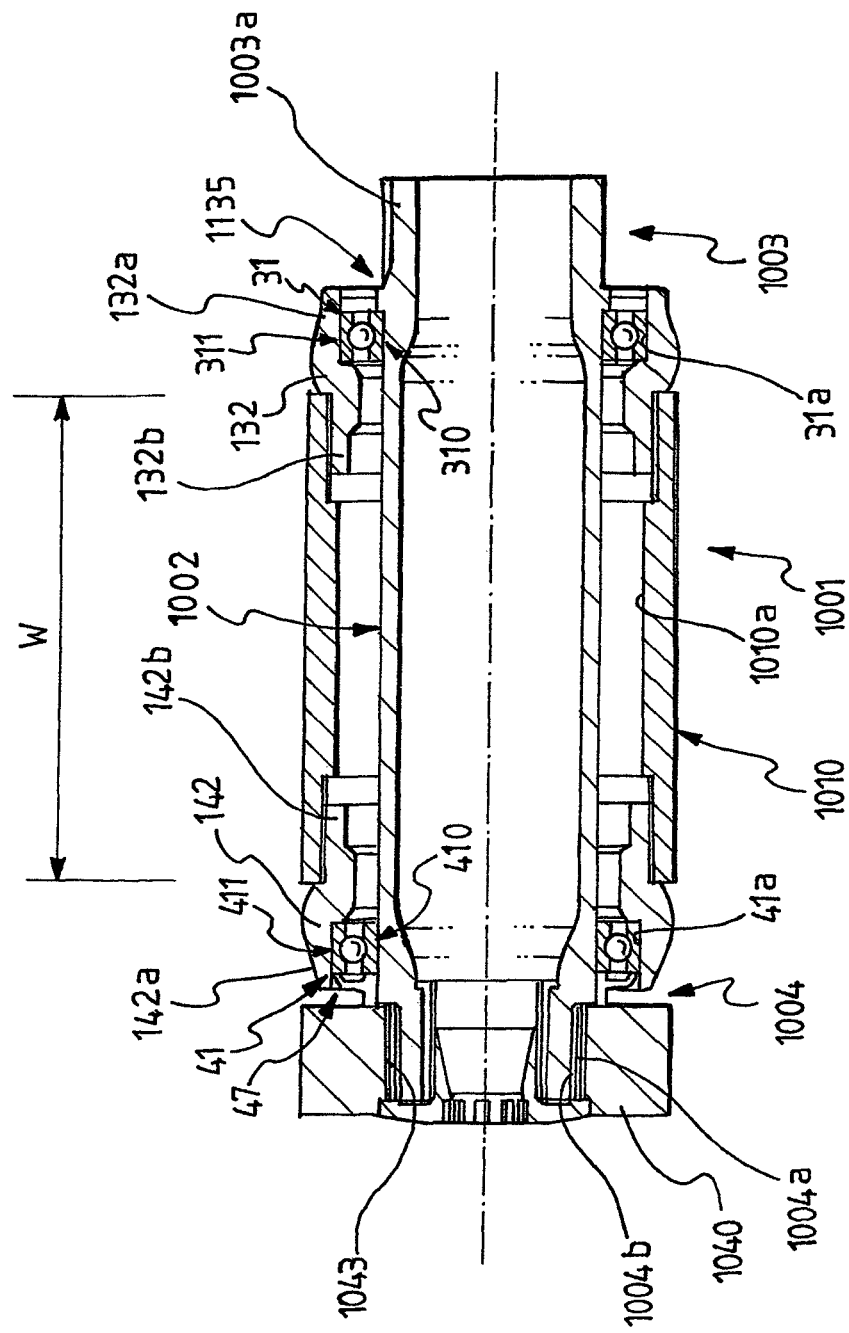
FIG. 2 schematically represents a longitudinal sectional view of a second embodiment of the disclosed bottom bracket assembly coupled with a crank arm.

FIG. 2 shows a second embodiment of a bottom bracket assembly, which is globally indicated with 1001.

In FIG. 2, structural elements identical to those of the assembly 1 described above with reference to FIG. 1, are indicated with the same reference numerals and are not described any further, whereas equivalent elements from the functional point of view to those of the assembly of FIG. 1 are indicated with the same reference numeral of FIG. 1 increased by 1000.

In particular, the assembly 1001 differs from the assembly 1 mainly in that the shaft 1002 has a single shoulder 1135 arranged at the right end portion 1003 of the shaft 1002.

The right bearing 31 rests with its inner ring 310 on the shoulder 1135 and with its outer ring 311 on the seat 31a of the adaptation element 132. The bearing 31 is mounted on the shaft 1002 in an axially inner position with respect to the shoulder 1135.

The left bearing 41 rests with its outer ring 411 on the seat 41a of the adaptation element 142.

The right end portion 1003 of the shaft 1002 has connection means, in the illustrated example an outer threading 1003a, for the connection to the right crank arm, not illustrated in FIG. 2.

The left end portion 1004 of the shaft 1002 has connection means, in the illustrated example a grooved profile 1004a, for the connection to the left crank arm 1040. In this case, as illustrated, the hole 1043 of the left crank arm 1040 has a grooved profile 1004b which is conjugated to the profile 1004a.

Between the left crank arm 1040 and the inner and outer rings 410 and 411 of the left bearing 41, a spacer 47 is operatively interposed which, when the left crank arm 1040 is mounted in final position, pushes the left bearing 41 into the seat 41a of the adaptation element 142, to achieve axial locking of the assembly 1001.

FIG. 3 shows a third embodiment of a bottom bracket assembly, which is globally indicated with 2001.

In FIG. 3, structural elements identical to those of the assembly 1 described above with reference to FIG. 1, are indicated with the same reference numerals and are not be described any further, whereas equivalent elements from the functional point of view to those of the assembly of FIG. 1 are indicated with the same reference numeral of FIG. 1 increased by 2000.

In particular, the bottom bracket assembly 2001 comprises right and left crank arm assemblies 2005, 2006, each comprising a crank arm (not shown) and a shaft element 2021, 2022 having substantially tubular shape.

The bottom bracket assembly 2001 is housed in the hollow body 2010a of the housing box 2010, provided in the bicycle frame.

In the box 2010, the crank arm assemblies 2005, 2006 are supported in rotation about a longitudinal axis X-X of the respective shaft elements 2021, 2022 through bearings 31, 41 arranged in first end portions 2021a, 2022a of the shaft elements 2021, 2022.

The first end portions 2021a, 2022a of the shaft elements 2021, 2022 have an outer diameter D2. The bearings 31, 41 are operatively interposed between the shaft elements 2021, 2022 and the adaptation elements 132, 142.

In particular, the axially inner end portions 132b and 142b of the adaptation elements 132, 142 of outer diameter De, are screwed to the hollow body 2010a of the box 2010 at its opposite externally threaded end portions. The opposite axially outer ends 132a and 142a of the adaptation elements 132, 142 comprise the seats 31a and 41a for the outer rings 311, 411 of the bearings 31, 41. The median planes Y1 and Y2 of each bearing 31 and 41 are spaced apart by a distance-between-centers D1.

Preferably, the inner rings 310, 410 of the bearings 31, 41 are each in contact with an annular element 50, 51 (preferably metallic), mounted outside such first end portions 2021a, 2022a. The annular element 50, 51 comprises, externally in radial direction, a shoulder 50a, 51a, against which the inner ring 310, 410 of the bearings 31, 41 is in abutment.

The crank arm assemblies 2005, 2006 are coupled together at second end portions 2021b, 2022b of the shaft elements 2021, 2022. The second end portions 2021b, 2022b have an outer diameter D3 and a radial thickness S1 that is preferably less than the radial thickness of the first end portions 2021a, 2022a.

The second end portions 2021b, 2022b comprise, at the respective free ends 2029, 2030, conjugate front toothings, preferably of the "Hirth" type. Such toothings allow a precise centering between the crank arm assemblies 2005, 2006.

The ends 2029, 2030, respectively, have a through hole 2031 and a threaded hole 2032, coaxial with respect to the shaft elements 2021, 2022, for the insertion of a threaded element 2033, which ensures that the coupling between the shaft elements 2021, 2022 is maintained during the operation.

The preferred numerical values of the diameters D2, D3 and De, of the distance-between-centers D1 and of the thickness S1, as well as the values of the inner and outer diameters of the bearings 31 and 41, preferably correspond to those indicated above in reference to the assembly 1 of FIG. 1.

At the free end portion 2021a, the shaft element 2021 has coupling means with the right crank arm (not shown), in the illustrated example an outer threading 2027.

The right crank arm (not shown), at a free end thereof, has a coupling seat, preferably comprising a through hole, for its mounting on the shaft element 2021. At the coupling seat, coupling means are defined that are conjugated with respect to those of the shaft element 2021. In particular, in the illustrated example, the coupling means of the crank arm comprise an inner threading.

The interface between the outer threading 2027 on the shaft element 2021 and the inner threading on the right crank arm is typically filled with adhesive material, so as to avoid the possibility of unscrewing during operation.

In an analogous way, the shaft element 2022 is connected to the left crank arm (not shown).

In the embodiments described above, the coupling between the adaptation elements 132, 142 and the hollow body 10a, 1010a and 2010a is achieved by screwing (through known types of threadings).

In alternative embodiments, the coupling can be achieved by mechanical interference and/or gluing. For the coupling by mechanical interference and/or gluing, different conjugate shapes between the adaptation element and the inner cavity of the box can be provided, which are per se conventional. It is also possible to provide holding ribs to avoid mutual rotations between the adaptation element and the inner cavity of the box, also per se conventional.

Figure 4:
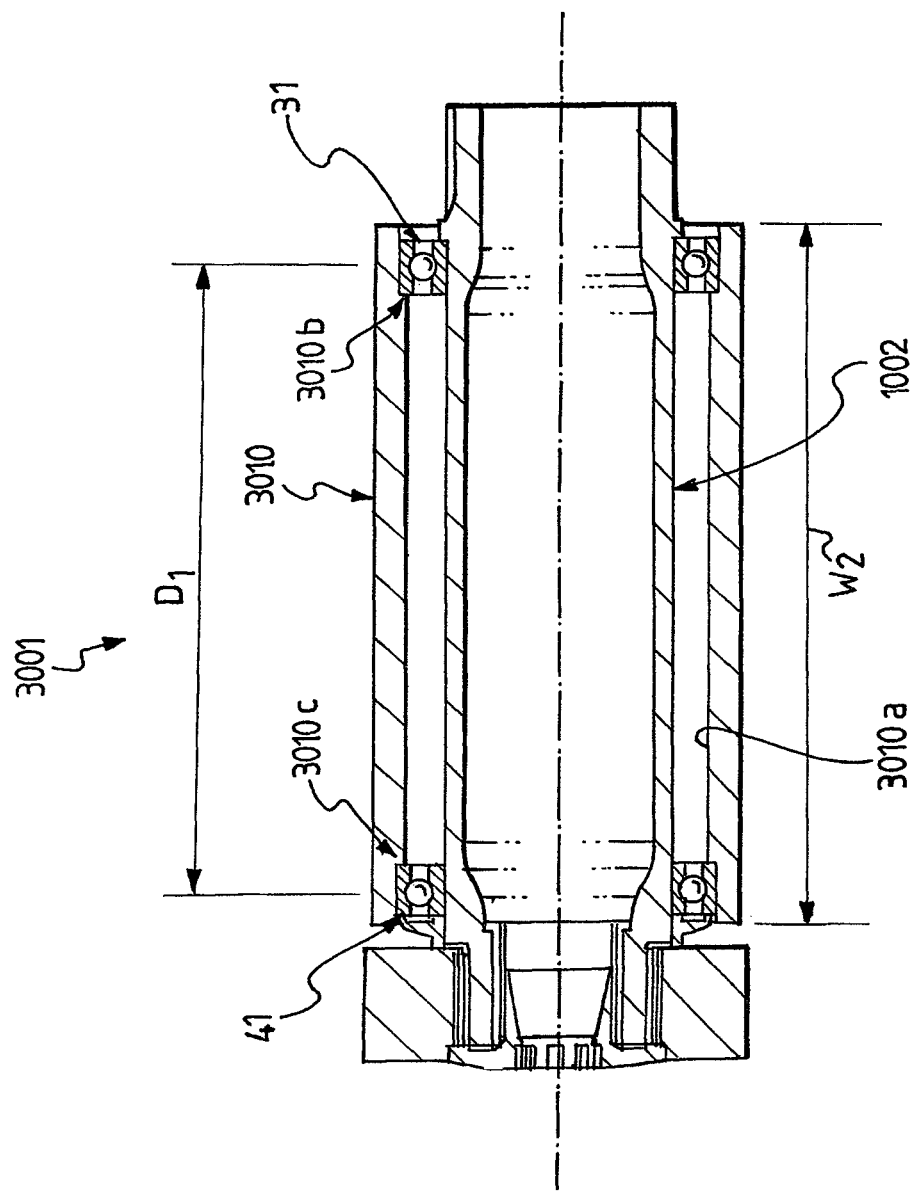
FIG. 4 schematically represents a longitudinal sectional view of a fourth embodiment of the disclosed bottom bracket assembly coupled with a crank arm.

FIG. 4 shows a fourth embodiment of a bottom bracket assembly, which is globally indicated with 3001.

In FIG. 4, structural elements identical to those of the assembly 1001 described above with reference to FIG. 2, are indicated with the same reference numerals and are not described any further, whereas equivalent elements from the functional point of view to those of the assembly of FIG. 2 are indicated with the same reference numeral of FIG. 2 increased by 2000.

The bottom bracket assembly 3001 differs from the bottom bracket assembly 1001 of FIG. 2 substantially just in that it does not have the adaptation elements 132, 142 of receiving of the bearings 31, 41.

Instead, the bearings 31, 41 are mounted directly on the inner surface of the hollow body 3010a of the housing box 3010 of the shaft 1002. Moreover, the bearings 31,41 are in abutment with respective shoulders 3010b, 3010c formed on the inner surface of the hollow body 3010a of the box 3010.

The box 3010 has a greater axial length W2 than the axial length W of the box 1010 of FIG. 2. The axial length W2 is preferably equal to about 95 mm.

A person of ordinary skill in the art can bring numerous modifications and variants to the bottom bracket assembly of a bicycle described above, in order to satisfy specific and contingent requirements, all of which are covered by the scope of protection of the following claims.

What is claimed is:

1. A bottom bracket assembly in a bicycle, comprising:
    a shaft having a predetermined diameter and extending along a predetermined longitudinal direction, said shaft having opposite ends with at least one of the opposite ends having at least one shoulder with a diameter greater than the predetermined diameter of the shaft;
    a housing box having an inner surface with at least one shoulder formed thereon;
    a pair of bearings that are mounted on opposite ends of the shaft and rotatably support the shaft with respect to the housing box, and at least one of the bearings is in abutment with the at least one shoulder formed on the inner surface of the housing box and with the at least one shoulder defined on the shaft; and
    wherein the distance between the median planes of the bearings along the longitudinal direction is in the range between 80 mm and 100 mm, bounds being included, and the shaft has an outer diameter that maintains a constant value between the median planes of the bearings.

2. The bottom bracket assembly of claim 1, wherein a central portion of the shaft, defined between the opposite end portions, has an outer diameter equal to that of at least one of the opposite end portions.

3. The bottom bracket assembly of claim 1, wherein the bearings have an outer diameter comprised in the range between 40 mm and 47 mm, bounds being included.

4. The bottom bracket assembly of claim 1, wherein the shaft is made from metallic material.

5. The bottom bracket assembly of claim 4, wherein the shaft is made from aluminum.

6. The bottom bracket assembly of claim 4, wherein the shaft is made from steel.

7. The bottom bracket assembly of claim 1, wherein the shaft is made from composite material.

8. The bottom bracket assembly of claim 6, wherein the shaft is hollow and has, in at least one central portion thereof, a thickness less than or equal to 0.65 mm.

9. The bottom bracket assembly of claim 8, wherein the shaft is hollow and has, in at least one central portion thereof, a thickness less than or equal to 3.5 mm.

10. The bottom bracket assembly of claim 8, wherein the composite material includes structural fibers incorporated in a matrix of polymeric material.

11. The bottom bracket assembly of claim 10, wherein the composite material includes layers of fabric of structural fibers incorporated in a matrix of polymeric material.

12. The bottom bracket assembly of claim 1, wherein the inner surface of the housing box has opposite shoulders formed thereon and each bearing of said pair of bearings abuts with a respective one of the opposite shoulders.

13. The bottom bracket assembly of claim 1, wherein housing box is integrally formed as a hollow cylinder.

14. A bottom bracket assembly in a bicycle, comprising a longitudinally extending spindle having a predetermined diameter and opposite ends, at least one of the opposite ends having at least one shoulder with a diameter greater than the predetermined diameter of the spindle, wherein said spindle is coaxial with and rotatable within a housing box having an inner radial surface with at least one shoulder formed thereon, and a pair of bearings disposed at opposite longitudinal ends of the spindle, each bearing having an outer radial surface directly coupled with the inner radial surface of the housing box and an inner radial surface coupled with an outer radial surface of the spindle, and at least one of the bearings abuts the at least one shoulder formed on the inner surface of the housing box and the at least one shoulder defined on the spindle, wherein the bearings each have a longitudinal midpoint, the midpoints being separated by a distance between 80 mm and 100 mm, and the spindle has an outer diameter that maintains a constant value between the midpoints.

15. A bicycle bottom bracket assembly in a bicycle comprising:
    an axle having a predetermined diameter and extending along a predetermined longitudinal axis and having opposite ends and at least one of the opposite ends having at least one shoulder with a diameter greater than the predetermined diameter of the axle;
    a housing box having an inner surface with at least one shoulder formed thereon; and
    a pair of bearings that are mounted on opposite ends of the axle and rotatably support the axle within the housing box, and at least one of the bearings is in abutment with the at least one shoulder formed on the inner surface of the housing box and with the at least one shoulder defined on the axle, with median bearing planes that are spaced along the longitudinal axis by a distance that ranges from 80 mm to 100 mm, and the axle has an outer diameter that maintains a constant value between the median bearing planes.

16. The bottom bracket assembly of claim 15 wherein the axle includes at least one radial shoulder that is in abutment with at least one bearing of the pair of bearings.

17. The bottom bracket assembly of claim 15 wherein the axle is made from a material selected from the group of aluminum, steel, and a composite material.

18. The bottom bracket assembly of claim 15 wherein each of the bearings has a radially inner diameter that ranges from 28 mm to 37 mm and a radially outer diameter that ranges from 40 mm to 47 mm.

19. A bottom bracket assembly in a bicycle, comprising:
a shaft having a predetermined diameter and extending along a predetermined longitudinal direction, said shaft having opposite ends with at least one of the opposite ends having at least one shoulder with a diameter greater than the predetermined diameter of the shaft;
a housing box having an inner surface with at least one shoulder formed thereon;
a pair of bearings that are mounted on opposite end portions of the shaft and rotatably support the shaft with respect to the housing box, and at least one of the bearings is in abutment with the at least one shoulder formed on the inner surface of the housing box and is directly coupled with the at least one shoulder formed on the inner surface of the housing box, said at least one of the bearings is also in abutment with the at least one shoulder defined on the shaft; and
wherein the distance between the median planes of the bearings along the longitudinal direction is in the range between 80 mm and 100 mm, bounds being included, and the shaft has an outer diameter that maintains a constant value between the median planes of the bearings.

20. A bottom bracket assembly in a bicycle, comprising:
a shaft having a predetermined diameter and extending along a predetermined longitudinal axis, said shaft having opposite ends with at least one of the opposite ends having at least one shoulder with a diameter greater than the predetermined diameter of the shaft;
a housing box having an inner surface with at least one shoulder formed thereon;
a pair of bearings that are mounted on opposite ends of the shaft and rotatably support the shaft with respect to the housing box, the bearings have median planes, defined as planes that are perpendicular to the longitudinal axis of the shaft, that pass halfway through the bearings, and at least one of the bearings is in abutment with the at least one shoulder formed on the inner surface of the housing box and with the at least one shoulder defined on the shaft; and
wherein the distance between the median planes of the bearings along the longitudinal direction is in the range between 80 mm and 100 mm, bounds being included, and the shaft has an outer diameter that maintains a constant value between the median planes of the bearings.

* * * * *